United States Patent
Hwang et al.

(10) Patent No.: US 9,591,366 B2
(45) Date of Patent: Mar. 7, 2017

(54) MULTIMEDIA PROVIDING SYSTEM AND MULTIMEDIA PROVIDING METHOD

(71) Applicant: NAVER CORPORATION, Seongnam-Si, Gyeonggi-Do (KR)

(72) Inventors: Seil Hwang, Seongnam-si (KR); Naeun Kim, Seongnam-si (KR)

(73) Assignee: NAVER CORPORATION, Gyeonggi-Do (KR)

(*) Notice: Subject to any disclaimer, the term of this patent is extended or adjusted under 35 U.S.C. 154(b) by 85 days.

(21) Appl. No.: 14/555,762

(22) Filed: Nov. 28, 2014

(65) Prior Publication Data
US 2015/0150042 A1   May 28, 2015

(30) Foreign Application Priority Data
Nov. 28, 2013 (KR) .................... 10-2013-0146031

(51) Int. Cl.
*H04N 21/6587* (2011.01)
*H04N 21/472* (2011.01)
(Continued)

(52) U.S. Cl.
CPC . *H04N 21/47217* (2013.01); *H04N 21/41407* (2013.01); *H04N 21/6587* (2013.01); *H04N 21/812* (2013.01)

(58) Field of Classification Search
CPC .............. H04N 21/812; H04N 21/6587; H04N 21/41407; H04N 21/47217
(Continued)

(56) References Cited

U.S. PATENT DOCUMENTS

2002/0032906 A1* 3/2002 Grossman .............. G06Q 30/02
725/42
2002/0100041 A1* 7/2002 Rosenberg ......... G06Q 30/0241
725/32
(Continued)

FOREIGN PATENT DOCUMENTS

JP     2001-309339        2/2001
JP     2007207193 A       8/2007
(Continued)

OTHER PUBLICATIONS

Xperia(TM) feat. Hatsune Miku S0-04E Instruction manual. NTT Domoko, Inc., Japan, Aug. 31, 2013 (with English Abstract).
(Continued)

*Primary Examiner* — Nathan Flynn
*Assistant Examiner* — Caroline Somera
(74) *Attorney, Agent, or Firm* — Harness, Dickey & Pierce, P.L.C.

(57) ABSTRACT

A moving picture providing method includes playing, by a processor, a second moving picture provided with respect to a first moving picture before or during playing the first moving picture; playing, by the processor, the first moving picture in response to a termination or a suspension in playing the second moving picture; activating, by the processor, a recall user interface (UI) for recalling the second moving picture during playing the first moving picture; and playing, by the processor, the second moving picture again in response to a request for recalling the second moving picture through the recall UI.

10 Claims, 14 Drawing Sheets

(51) Int. Cl.
*H04N 21/81* (2011.01)
*H04N 21/414* (2011.01)
*H04N 21/431* (2011.01)
*H04N 21/2387* (2011.01)

(58) Field of Classification Search
USPC ........................................ 725/22, 32, 36, 42
See application file for complete search history.

(56) References Cited

U.S. PATENT DOCUMENTS

| | | | | |
|---|---|---|---|---|
| 2002/0161780 | A1* | 10/2002 | Dutta | G06F 17/30017 |
| 2012/0072272 | A1* | 3/2012 | Kilar | G06Q 30/02 |
| | | | | 705/14.4 |
| 2013/0110595 | A1* | 5/2013 | Acosta-Cazaubon | G06Q 30/02 |
| | | | | 705/14.7 |
| 2013/0247096 | A1* | 9/2013 | Miller | G06Q 30/02 |
| | | | | 725/34 |

FOREIGN PATENT DOCUMENTS

| | | |
|---|---|---|
| JP | 2008199674 A | 8/2008 |
| JP | 2010509873 A | 3/2010 |
| JP | 2010526497 A | 7/2010 |
| JP | 2010538588 A | 12/2010 |
| JP | 2011501504 A | 1/2011 |
| JP | 2011029786 A | 2/2011 |
| KR | 10-2013-0082827 | 7/2013 |
| WO | WO-2013145033 A1 | 10/2013 |

OTHER PUBLICATIONS

Japanese Office Action dated Oct. 13, 2015 issued in corresponding Japanese Patent Application No. 2014-200990.
Korean Office Action dated May 27, 2015 issued in corresponding Korean Application No. 10-2013-0146031.
Nov. 16, 2011 "Youtube Partnership System".

* cited by examiner

MULTIMEDIA PROVIDING SYSTEM AND MULTIMEDIA PROVIDING METHOD

CROSS-REFERENCE TO RELATED APPLICATION

This application claims priority from and the benefit of Korean Patent Application No. 10-2013-0146031, filed on Nov. 28, 2013, which is hereby incorporated by reference for all purposes as if fully set forth herein.

BACKGROUND

Field

Example embodiments relate to a system and method for providing an advertisement using a moving picture.

Related Art

An advertising method using a general moving picture may display an advertisement during a predetermined or, alternatively, desired period of time before or during providing a moving picture to a user.

For example, conventional devices may extract an advertisement keyword from a moving picture and provide an advertisement associated with the extracted advertisement keyword.

However, an advertisement video according to the related art may be displayed or played only once. Once the advertisement video is terminated or skipped, a user may not be able to view the advertisement video again.

Also, although consumption of moving pictures and corresponding actions of advertising industry to cope therewith are rapidly increasing domestically and externally, it may be desirable to provide a method for providing an advertisement video service in a new form.

SUMMARY

Example embodiments provide a system and meted that enables an advertiser to achieve a relatively high advertising effect without obstructing a user in the course of viewing a moving picture.

Example embodiments also provide a system and method capable of servicing an effective moving picture advertisement using a mobile environment.

According to one or more example embodiments, a moving picture providing method includes playing, by a processor, a second moving picture provided with respect to a first moving picture before or during playing the first moving picture; playing, by the processor, the first moving picture in response to a termination or a suspension in playing the second moving picture; activating, by the processor, a recall user interface (UI) for recalling the second moving picture during playing the first moving picture; and playing, by the processor, the second moving picture again in response to a request for recalling the second moving picture through the recall UI.

The activating a recall UI may include displaying the recall UI configured in a banner form on a screen on which the first moving picture is played.

The activating a recall UI may include displaying the recall UI on a screen on which the first moving picture is paused, when the first moving picture being played enters into a pause state.

The activating of a recall UI may include displaying the recall UI on a screen on which the first moving picture is played, in response to an activation of a UI associated with the first moving picture on the screen on which the first moving picture is played.

The recall UI may be displayed on an area on which the UI associated with the first moving picture is displayed or an area adjacent thereto.

The playing a second moving picture may include displaying a second moving picture title configured in an image or text form on a screen on which the second moving picture is played, and the activating a recall UI may include displaying the recall UI configured in a banner on a screen on which the first moving picture is played, the banner having substantially the same shape as the second moving picture title.

The playing the second moving picture again may include switching a screen on which the first moving picture is played to a screen on which the second moving picture is played, or displaying the screen on which the second moving picture is played on the screen on which the first moving picture is played in a layer form.

The second moving picture may be an advertisement video provided before or during playing the first moving picture.

According to one or more example embodiments, a moving picture providing method includes providing a second moving picture to a terminal of a user before or during playing a first moving picture provided to the terminal of the user; providing a recall banner of the second moving picture during playing the first moving picture after a termination or a suspension in playing the second moving picture at the terminal of the user; and providing the second moving picture again to the terminal of the user in response to a request from the terminal of the user for recalling the second moving picture through the recall banner.

The providing a recall banner of the second moving picture may include providing the recall banner when the first moving picture being played at the terminal of the user enters into a pause state or in response to an activation of a UI associated with the first moving picture.

The second moving picture may be configured to display a second moving picture title configured in an image or text form on a screen on which the second moving picture is played, and the providing of the recall banner of the second moving picture may include providing the recall banner, the banner having substantially the same shape as the second moving picture title.

According to one or more example embodiments, a non-transitory computer-readable storage media stores a program that, when executed by a processor, causes the processor to perform operations including playing a second moving picture provided with respect to a first moving picture before or during playing the first moving picture; playing the first moving picture in response to a termination or a suspension in playing the second moving picture; activating a recall user interface (UI) for recalling the second moving picture during playing the first moving picture; and playing the second moving picture again in response to a request for recalling the second moving picture through the recall UI.

According to one or more example embodiments, a moving picture providing system includes a memory in which at least one program is loaded; and at least one processor, wherein, according to a control of the program, the at least one processor is configured to execute, a process of playing a second moving picture provided with respect to a first moving picture before or during playing the first moving picture; a process of playing the first moving picture in response to a termination or a suspension in playing the second moving picture; a process of activating a recall user interface (UI) for recalling the second moving picture during playing the first moving picture; and a process of playing the second moving picture again in response to a request for recalling the second moving picture through the recall UI, the at least one processor being configured such that, during the process of activating the recall UI, the at least one processor displays the recall UI configured in a banner form on a screen on which the first moving picture is played.

According to one or more example embodiments, a moving picture providing system includes a memory in which at least one program is loaded; and at least one processor, wherein, according to a control of the program, the at least one processor is configured to execute, a process of providing a second moving picture to a terminal of a user before or during playing a first moving picture provided to the terminal of the user; a process of providing a recall banner of the second moving picture during playing the first moving picture after a termination or a suspension in playing the second moving picture at the terminal of the user; and a process of providing the second moving picture again to the terminal of the user in response to a request from the terminal of the user for recalling the second moving picture through the recall banner.

Additional features of the example embodiments will be set forth in the description which follows, and in part will be apparent from the description, or may be learned by practice of the example embodiments.

It is to be understood that both the foregoing general description and the following detailed description are explanatory and are intended to provide further explanation of the example embodiments as claimed.

According to one or more example embodiments, it is possible to reflect a current trend of expanding to a single content genre beyond a stereotyped product advertisement by providing a recallable advertisement while using a moving picture. Also, it is possible to satisfy a user request for viewing, again, an advertisement video by enabling the user to view the advertisement video again.

Also, according to one or more example embodiments, it is possible to enable an advertiser to achieve a relatively high advertising effect by displaying a banner of a recallable advertisement video at a point in time at which a moving picture is paused or a user interface (UI) of the moving picture is activated.

Also, according to one or more example embodiments, it is possible to decrease a moving picture view obstruction level of a user by pausing a moving picture being viewed by the user in response to a request of the user and concurrently, recalling an advertisement video in an environment in which the user is substantially or, alternatively, maximally not obstructed in the course of viewing the moving picture.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF EXAMPLE EMBODIMENTS

Figure 1:
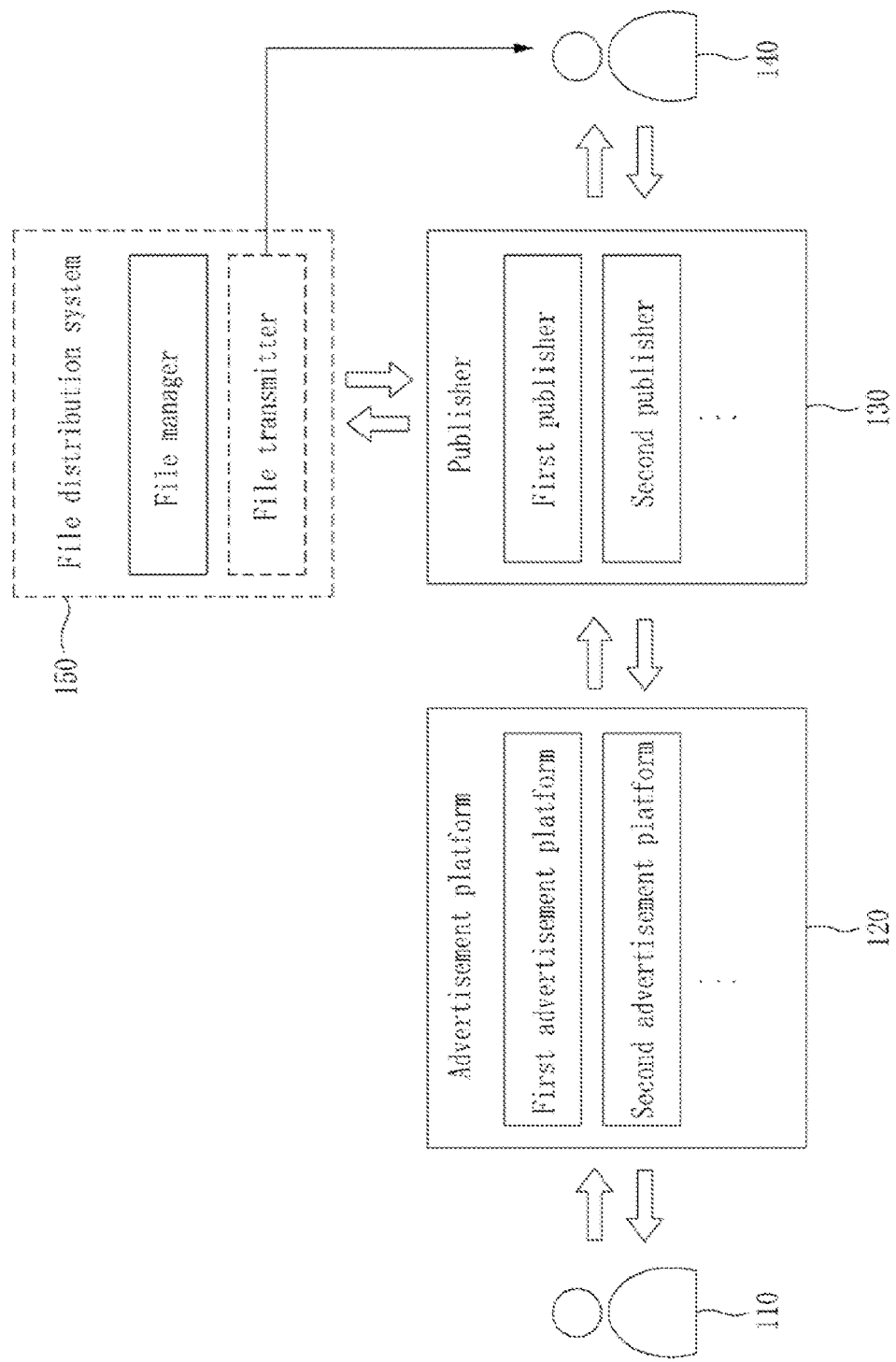
FIG. 1 illustrates an example of an advertisement providing environment according to one or more example embodiments.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein. Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are described herein with reference to schematic illustrations of idealized embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

FIG. 1 illustrates an example of an advertisement providing environment according to one or more example embodiments. Here, FIG. 1 illustrates an advertiser 110, an advertisement platform 120, a publisher 130, and a user 140. The advertiser 110 and the user 140 may refer to electronic terminals including, for example, a personal computer (PC) and/or a smartphone substantially used by one or both of the advertiser 110 and the user 140. The smartphone and PC may include processors. That is, referring to FIG. 1, lines with arrowheads present among the advertiser 110, the advertisement platform 120, the publisher 130, and the user 140 may indicate that data may be transmitted and received among a terminal used by the advertiser 110, the advertisement platform 120, the publisher 130, and a terminal used by the user 140 over a wired/wireless network.

The advertisement platform 120 may refer to a system for performing bidding on an advertisement of the advertiser 110, matching an advertisement with a keyword, sorting advertisements or advertisers, providing an advertisement to the publisher 130, charging for displaying an advertisement, and the like. The advertisement platform 120 may be implemented, for example, by an electronic device that includes a processor. With respect to general and technical aspects of the advertisement platform 120, description construable with reference to related arts of a search advertisement and/or a banner advertisement platform delivered through the Internet is omitted.

In the present specification, the term "publisher" may be interchangeably used with the term "site". However, description using the term "site" is not to be constructed as excluding a probability that the example embodiments may be carried out in an environment beyond a general PC website connection such as an application screen executed on a mobile terminal. The term "site" may be compatibly used with a "publishing site" or a "publisher". That is, each site may correspond to an individual publisher, for example, a first publisher and a second publisher included in the publisher 130. Here, the term "site" may include any type of website through which an advertisement may be displayed. The site may be provided to the user 140 over a wired or wireless network by, for example, a server which may include a processor. The site may indicate a single webpage configuring a website.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA).

Also, in the present specification, "displaying" an advertisement may be interpreted as providing promotional content associated with the advertiser 110 to a visitor of a corresponding site through the site or the publisher. Promotional content may be any content used to promote something including, for example, one or more of a text, an image, a sound, a video, and a hyperlink. Further, a "selection" on the displayed advertisement may indicate an occurrence of a situation in which the advertiser 110 intends to deliver the promotional content in such a manner that the user 140, which may be for example, a site visitor, shows a reaction using a mouse click or a touch on a touch screen with respect to the provided promotional content such as the text and/or the image provided through the site. For example, the situation intended by the advertiser 110 may include a situation in which a page associated with the advertiser 110 is displayed to a visitor selecting an advertisement and a situation in which the visitor performs an act such as joining page associated with the advertiser 110 or purchasing a product.

Referring to FIG. 1, the publisher 130 may provide a site of the publisher 130 to the user 140, and may provide pages included in the site to the user 140 through the site or may provide a search result associated with a keyword to the user 140 in response to the keyword input through the site. Here, the publisher 130 may receive, from the advertisement platform 120, advertisements to be displayed through pages and may provide the advertisements to the user 140. For example, the publisher 130 may receive, from the advertisement platform 120, advertisements associated with a keyword input from the user 140 and may provide the advertisements to the user 140 as a search result.

The publisher 130 may display a path, for example, a screen, via which the user 140 directly receives an advertisement. For example, in a general online environment, advertisements may be displayed through a website. Each of a plurality of individual advertisement platforms, for example, a first advertisement platform and a second advertisement platform included in the advertisement platform 120 may display an advertisement through at least one individual publisher among a plurality of publishers, for example, the first publisher and the second publisher included in the publisher 130. Also, each of the plurality of individual publishers may display the advertisement to the user 140 through at least one site, and in addition to displaying the advertisement, may further provide at least one service among a variety of services capable of being provided over a wired/wireless network, such as an integrated search service, a café/blog service, and a social network service.

Depending on example embodiments, the term 'moving picture providing system' according to one or more example embodiments, may refer to, for example, a computer system that constitutes a single advertisement platform among the plurality of individual advertisement platforms, may refer to a computer system that constitutes a single publisher among the plurality of individual publishers, or may refer to a computer system that constitutes a terminal of the user 140. Further, the moving picture providing system described herein may be implemented by computer system including, for example, the computing system 200 which will be discussed in greater detail below with reference to FIG. 2. In FIG. 1, a file distribution system 150 may be selectively used depending on a necessity. For example, when the user 140 uses a mobile terminal, the file distribution system 150 may provide the user 140 with a file for installing an application associated with the publisher 130 in the mobile terminal. To this end, the file distribution system 150 may include a file manager configured to store and maintain the file and a file transmitter configured to transmit the file to the mobile terminal in response to a request of the mobile terminal. The application may be installed in the mobile terminal using the transmitted file. The application may control the mobile terminal to perform operations of a moving picture providing method according to one or more example embodiments. The file distribution system 150 may be implemented, for example, by an electronic device that includes a processor.

Figure 2:
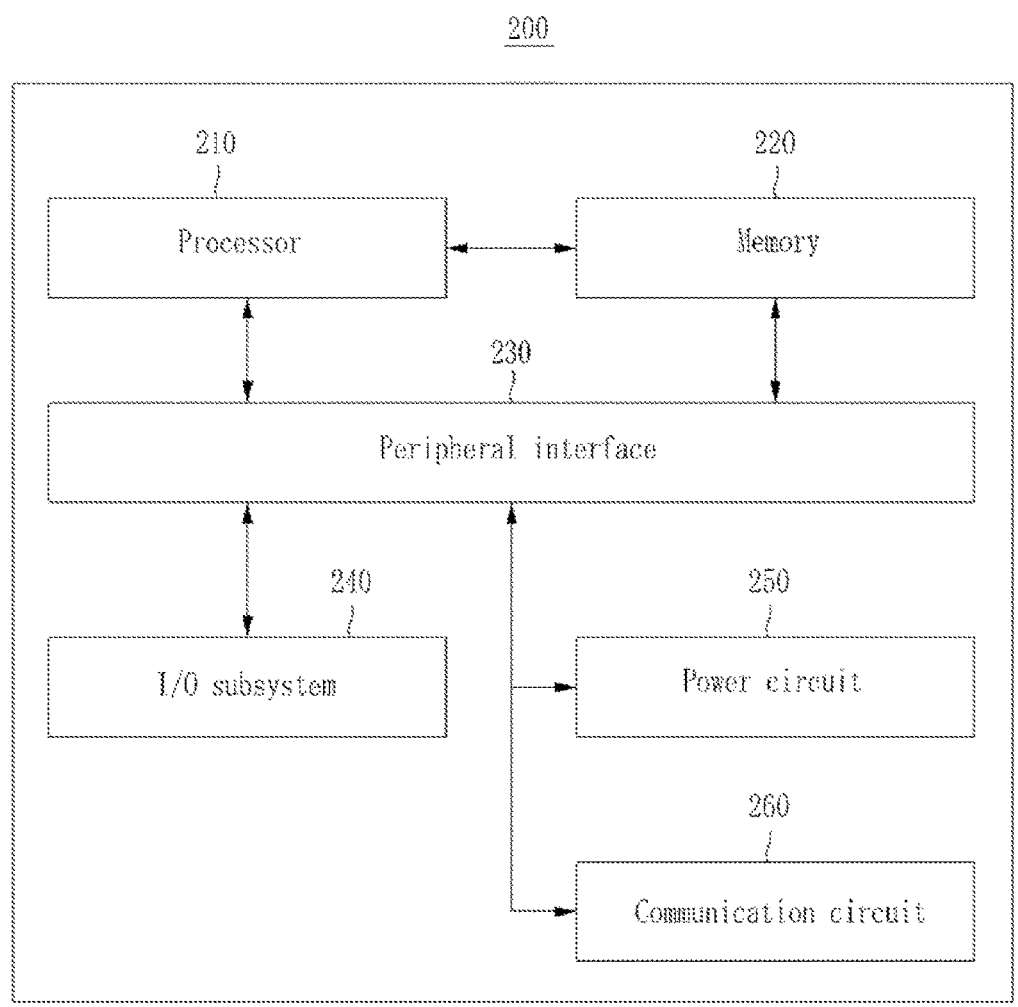
FIG. 2 illustrates an example of a configuration of a computer system according to one or more example embodiments.

FIG. 2 illustrates an example of a configuration of a computer system 200 according to one or more example embodiments. Referring to FIG. 2, the computer system 200 may include at least one processor 210, a memory 220, a peripheral interface 230, an input/output (I/O) subsystem 240, a power circuit 250, and a communication circuit 260. Any or all of the advertisement platform 120, the publisher 130, the file distribution system 150, a terminal of the advertiser 110, and a terminal of the user 140 may be implemented by a device having the structure of the computer system 200. Accordingly, devices having the structure of the computer system 200 may be programmed to perform any or all functions described herein as being performed by the advertisement platform 120, the publisher 130, the file distribution system 150, a terminal of the advertiser 110, or a terminal of the user 140.

The computer system 200 of FIG. 2 is only an example and thus, may further include additional components not illustrated in FIG. 2 or may have a configuration or an arrangement in which at least two components are combined. For example, the computer system 200 for a mobile terminal may further include a touch screen and a sensor in addition to the components of FIG. 2, and a circuit for radio frequency (RF) communication may be included in the communication circuit 260. Components includable in the computer system 200 may be configured as hardware including an integrated circuit specialized for processing at least one signal or an application, software, or a combination of hardware and software.

The memory 220 may include, for example, a high-speed random access memory, a magnetic disk, a static random access memory (SRAM), dynamic RAM (DRAM), a read only memory (ROM), a flash memory, and a non-volatile memory. The memory 220 may include a software module required for an operation of the computer system 200, a set of instructions, and a variety of data. Here, an access from another component such as the processor 210 or the peripheral interface 230 to the memory 220 may be controlled by the processor 210.

The peripheral interface 230 may combine an I/O peripheral device of the computer system 200 with the processor 210 and the memory 220. The processor 210 may perform a variety of functions for the computer system 200 and may process data by executing the software module or the set of instructions stored in the memory 220.

The I/O subsystem 240 may combine a variety of I/O peripheral devices with the peripheral interface 230. For example, the I/O subsystem 240 may include a controller configured to combine a peripheral device, such as a monitor, a keyboard, a mouse, and a printer, or a touch screen or a sensor depending on a necessity, with the peripheral interface 230. The I/O peripheral devices may also be combined with the peripheral device 230 without using the I/O subsystem 240.

The power circuit 250 may supply power to a portion of or all of the components included in a terminal. For example, the power circuit 250 may include a power management system, at least one power source such as a battery and alternating current (AC), a charging system, a power failure detection circuit, a power converter or inverter, a power state indicator, and other components for power generation, management, and distribution.

The communication circuit 260 enables communication with another communication system using at least one external port. Alternatively, as described above, the communication circuit 260 may also enable communication with another computer system by including an RF circuit and thereby transmitting and receiving an RF signal known as an electromagnetic signal.

Hereinafter, a service model configured to provide a second moving picture that is a different video connected to a first moving picture before or during playing the first moving picture according to one or more example embodiments will be described. Here, a description will be made based on an example of using an advertisement video as a representative example of the second moving picture.

Initially, the advertiser 110 may register, with the advertisement platform 120, an advertisement source for producing an advertisement through the advertiser 110 platform provided from the advertisement platform 120. Here, the advertisement source may include an image or a moving picture as video content, and may further include a title and description (T&D) and a representative image. Further, the advertiser 110 may register keywords for each advertisement source.

Accordingly, the advertisement platform 120 may register video content (hereinafter, also referred to as an "advertisement video") corresponding to the advertisement source registered by the advertiser 110 in association with the corresponding advertiser 110. Further, the advertisement platform 120 may store and manage the registered keywords in association with the advertisement video.

Meanwhile, the publisher 130 may provide a variety of moving picture contents (hereinafter, also referred to as a "moving picture") to the user 140 through a site. Here, the publisher 130 may receive the advertisement video from the advertisement platform 120, and may provide the advertisement video and the moving picture to the user 140. The advertisement platform 120 may randomly select and provide an advertisement video irrelevant to the moving picture, or may extract and provide an advertisement video relevant to the moving picture. For example, the advertisement video relevant to the moving picture may be selected as a result of comparing a keyword extracted from the moving picture and a keyword registered in association with the advertisement video. The comparison between keywords may employ technologies for measuring the relevance between words, for example, keywords.

The publisher 130 may configure the advertisement video provided from the advertisement platform 120 in an in-stream type to be displayed within a moving picture player, and may display an in-stream advertisement at a point in time corresponding to at least one of before, during, and after playing the moving picture. The advertisement video may be classified as a pre-roll advertisement, a mid-roll advertisement, or a post-roll advertisement based on point in time at which the advertisement video is played relative to the moving picture.

FIGS. 3 through 9 illustrate examples of a pre-roll advertisement displaying process according to one or more example embodiments. FIGS. 3 through 9 illustrate examples of a screen of a mobile terminal 100 on which a moving picture and an advertisement video are displayed. The mobile terminal 100 may have the structure and operation of the computer system 200 illustrated in FIG. 2. Accordingly, a device having the structure of the computer system 200 may be programmed to perform any or all functions described herein as being performed by the mobile terminal 100. Further, the mobile terminal 100 may be a terminal of the user 140. As an example, FIGS. 3 through 9 may be examples of an execution screen of a moving picture player executed at a terminal of the user 140. Further, the execution screen may be an execution screen of a moving picture player associated with a publisher 130.

Figure 3:
FIGS. 3 through 9 illustrate examples of a pre-roll advertisement displaying process according to one or more example embodiments.
Figure 4:
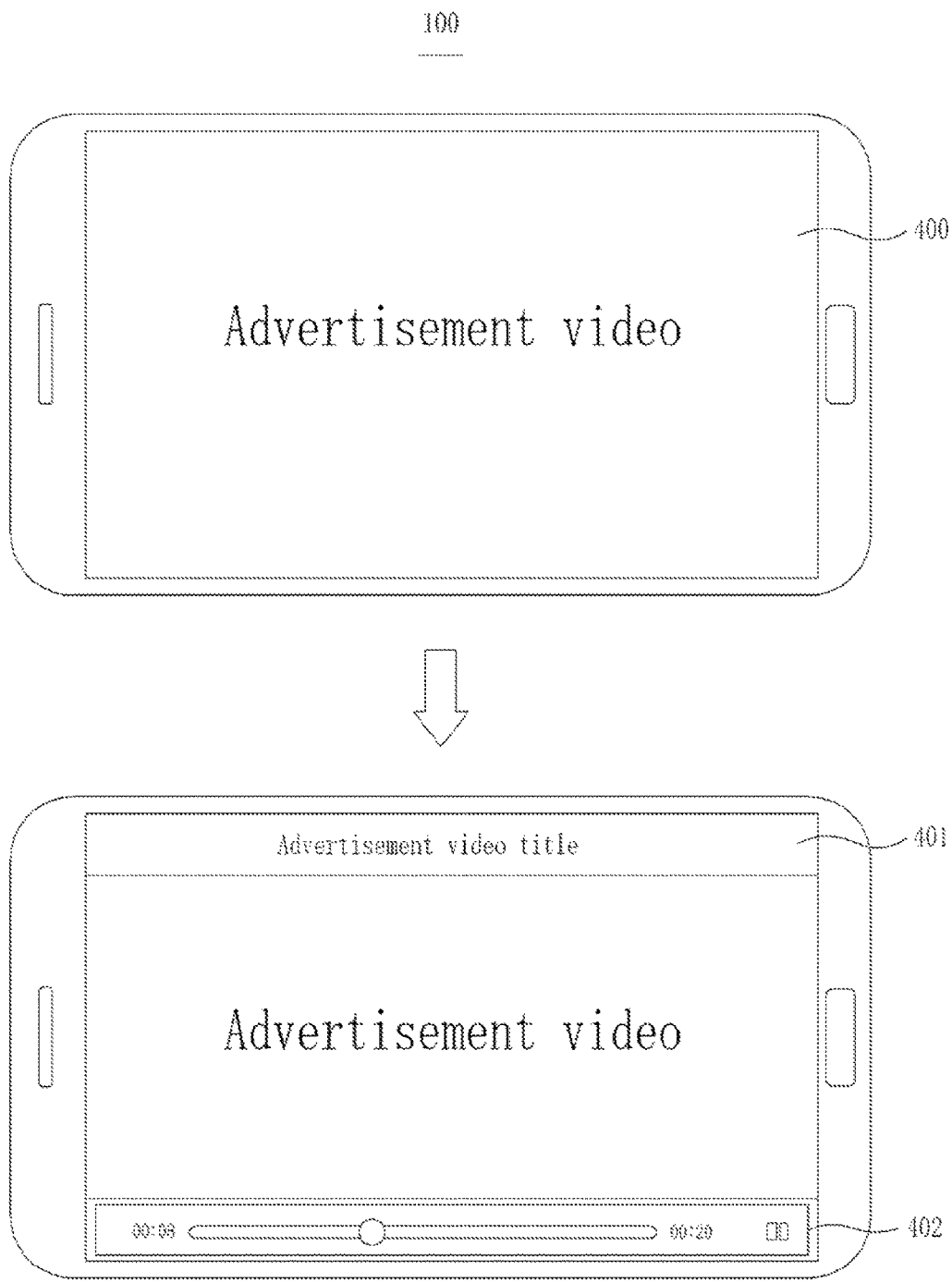
Figure 5:

FIG. 3 illustrates an example of a pre-roll advertisement screen. The pre-roll advertisement screen may be configured as a screen (hereinafter, also referred to as an "advertisement screen") 300 on which an advertisement video is displayed. Referring to FIG. 4, when playing an advertisement video, an advertisement video title 401 may be displayed on one area, for example, at an upper end of an advertisement screen 400, and a player user interface (UI) 402 for controlling a play of the advertisement video may be displayed by the mobile terminal 100 on another area, for example, at a lower end of the advertisement screen 400, in response to a touch of a user 140 on the advertisement screen 400. Here, the advertisement image title 401 may be provided in a form of an image or a text. The advertisement video player UI 402 may be provided by the mobile terminal 100 as a UI bar including function buttons, for example, a pause and a play. In response to a subsequent touch of the user 140 on the advertisement screen 400, or in response to the elapse of a predetermined or, alternatively, desired period of time, the mobile terminal 100 may remove the advertisement video title 401 and the player UI 402 of the advertisement video from the advertisement screen 400. Referring to FIG. 5, if a predetermined or, alternatively, desired period of time, for example, five seconds is elapsed after starting playing an advertisement video, a skip UI 503 capable of skipping the advertisement video may be displayed by the mobile terminal 100 on one area, for example, at a lower right end of an advertisement screen 500.

Figure 6:
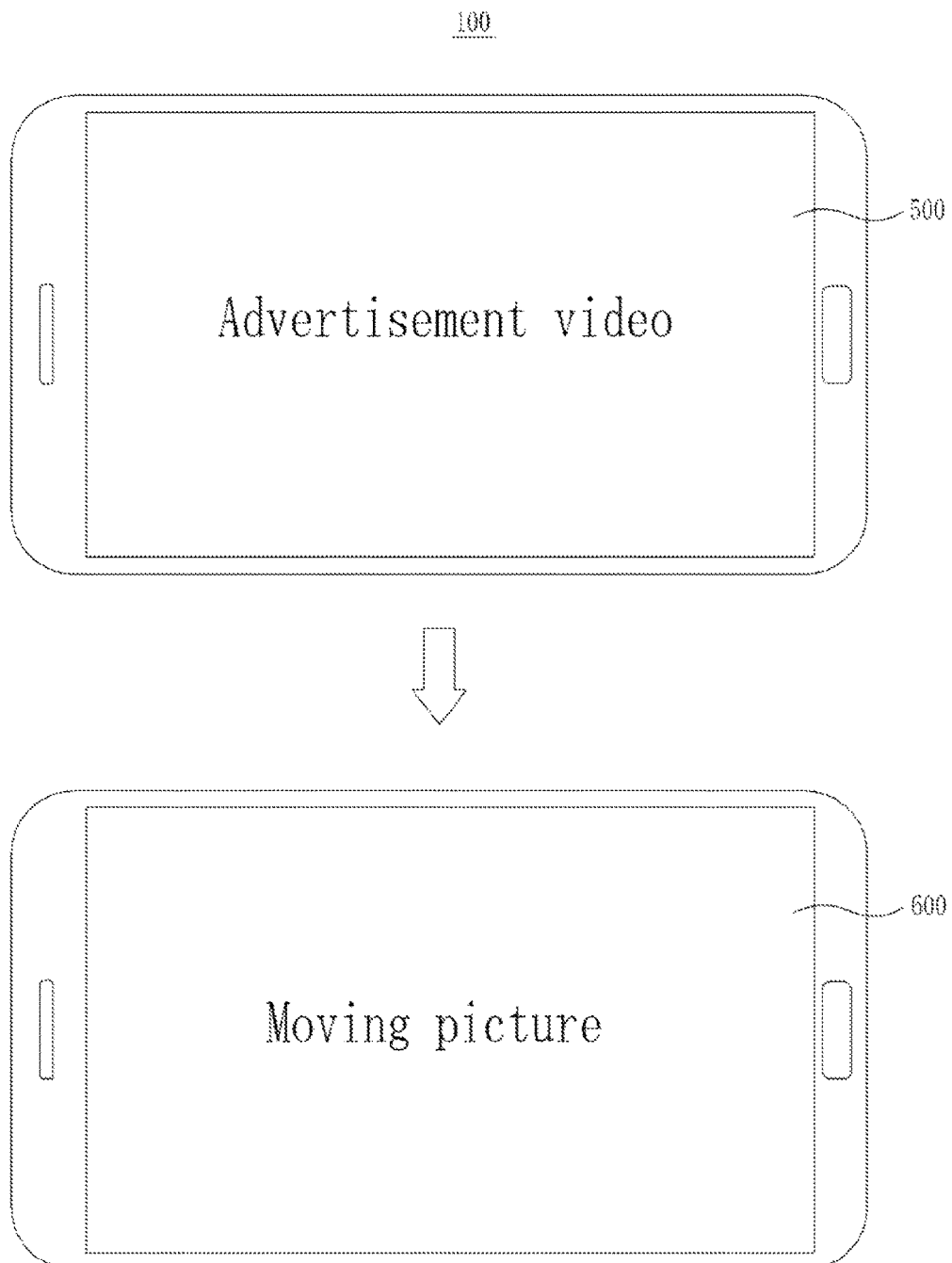

In response to a touch on the skip UI 503 displayed on the advertisement screen 500, the advertisement video being played may be suspended, the advertisement screen 500 may be switched to a screen (hereinafter, also referred to as a "moving picture screen") 600 on which a moving picture is played, and the moving picture may be played on the moving picture screen 600, as is shown in FIG. 6. Further, according to one or more example embodiments, in response to the advertisement video being played being terminated automatically without the skip UI 503 on the advertisement screen 500 being touched, for example after play of the advertisement video is completed, the moving picture may be similarly automatically played on the moving picture screen 600.

Figure 7:
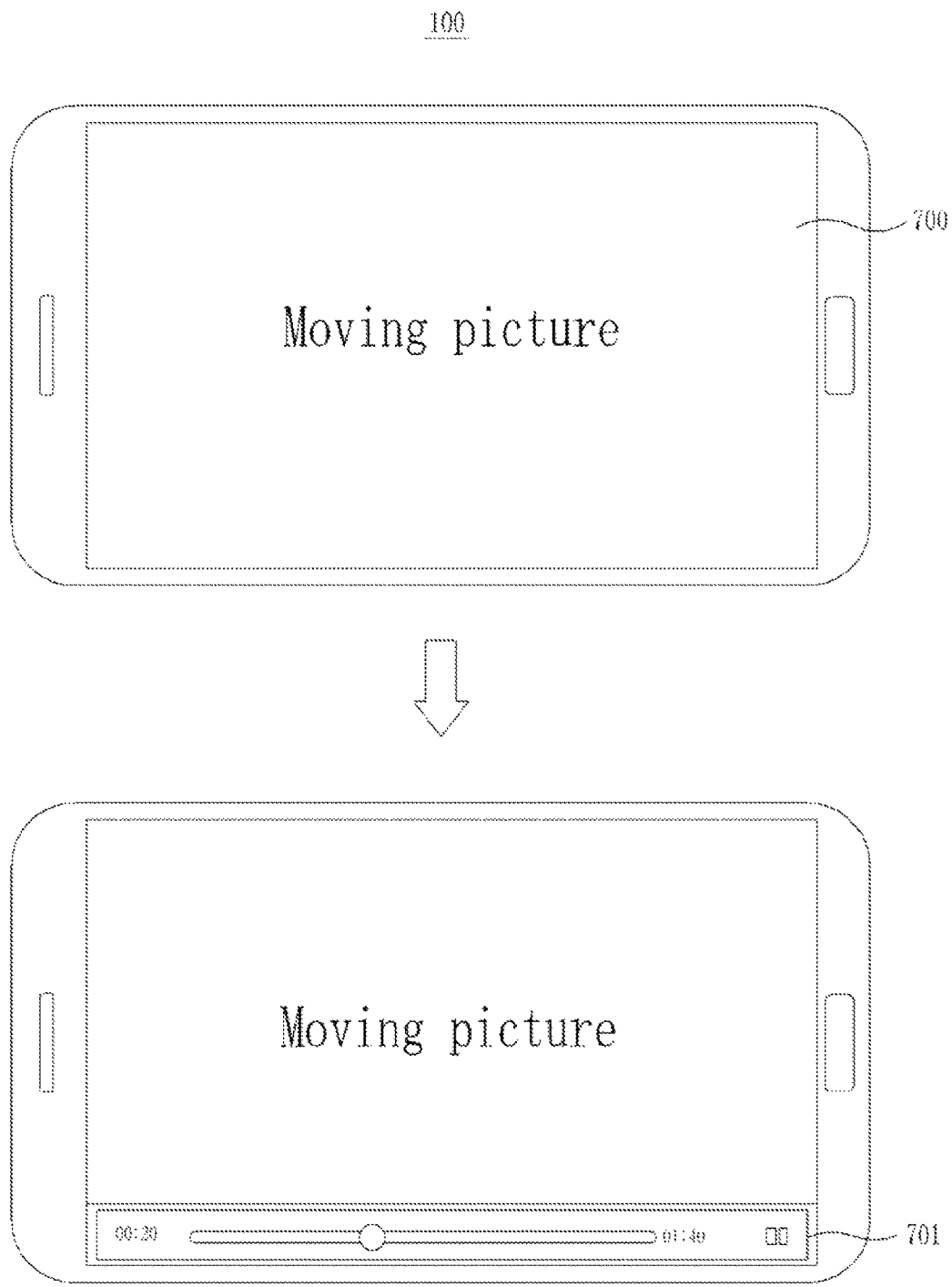
Figure 8:
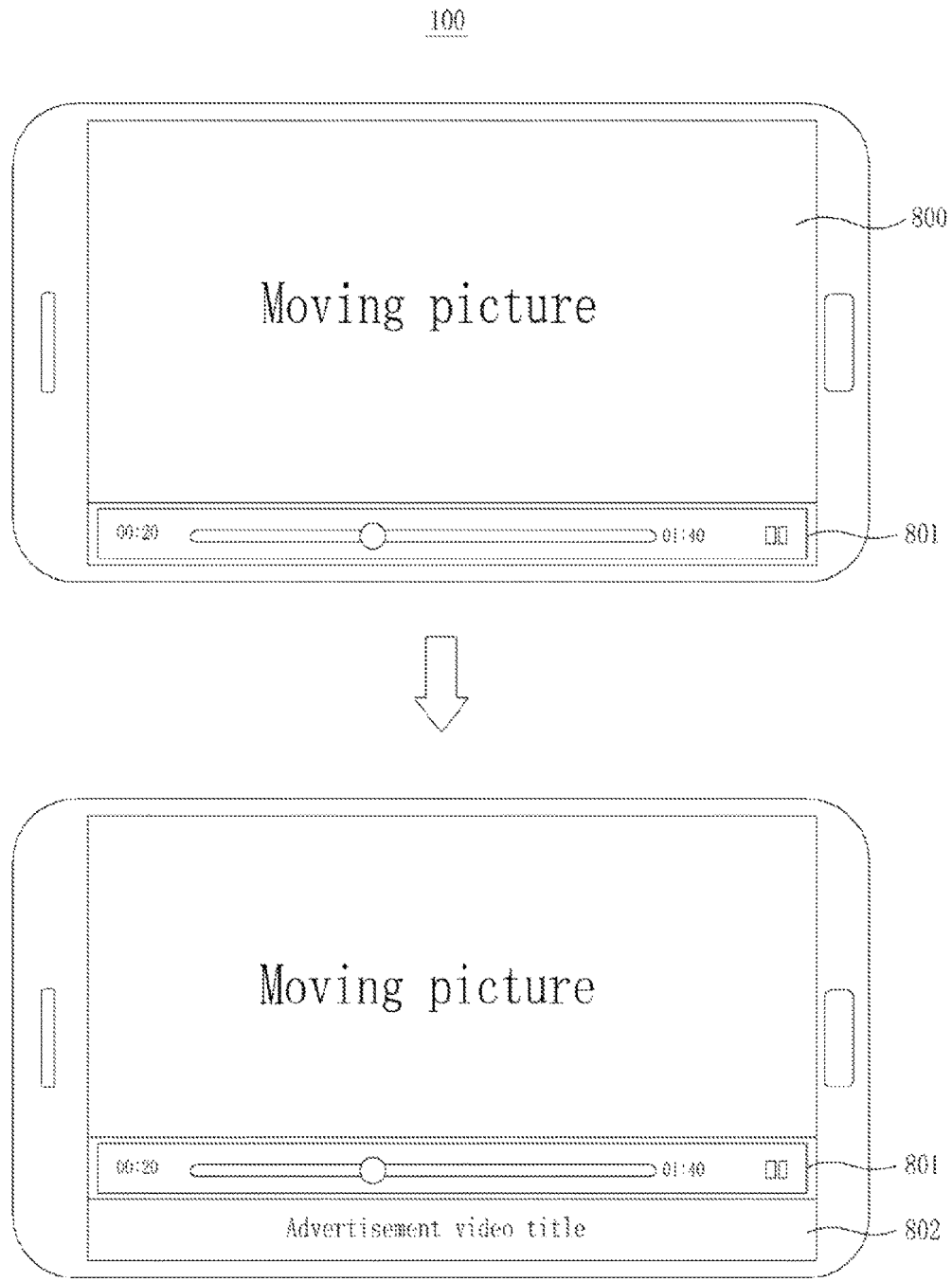

Referring to FIG. 7, in response to a touch of a user 140 on a moving picture screen 700 during playing a moving picture, a moving picture player UI 701 for controlling the play of the moving picture may be displayed by the mobile terminal 100 on one area, for example, at a lower end of the moving picture screen 700. Here, the moving picture player UI 701 may be provided by the mobile terminal 100 as a UI bar including function buttons, for example, a pause and a play. Referring to FIG. 8, a moving picture player UI 801 may be displayed on a moving picture screen 800. In this instance, if a predetermined or, alternatively, desired period of time, for example, one second is elapsed, by the mobile terminal 100 may roll up or raise the moving picture player UI 801 and display, on the moving picture screen 800, a recall banner 802 capable of recalling, in response to being selected (e.g., touched) by the user 140, an advertisement video that was played by the mobile terminal 100 before playing the moving picture. Here, the recall banner 802 may be provided in a form of an image or a text. Also, the recall banner 802 may be configured in a form that is the same, substantially the same or similar to the advertisement video title 401 of FIG. 4. For example, the recall banner 802 may have the same shape, size, position, coloring and/or font as the video title 401. Accordingly, a user 140 may more easily recognize that a corresponding UI functions to recall an advertisement video previously viewed by the user 140. Here, when no action is performed on the moving picture screen 800 during a predetermined or, alternatively, desired period of time, the mobile terminal 100 may hide elements, for example, the moving picture player UI 801 and the recall banner 802, displayed on the moving picture screen 800. Also, in response to a touch on an area of the screen of the mobile terminal 100 other than an area on which the elements are displayed on the moving picture screen 800, the mobile terminal 100 may hide the elements displayed on the moving picture screen 800.

Figure 9:
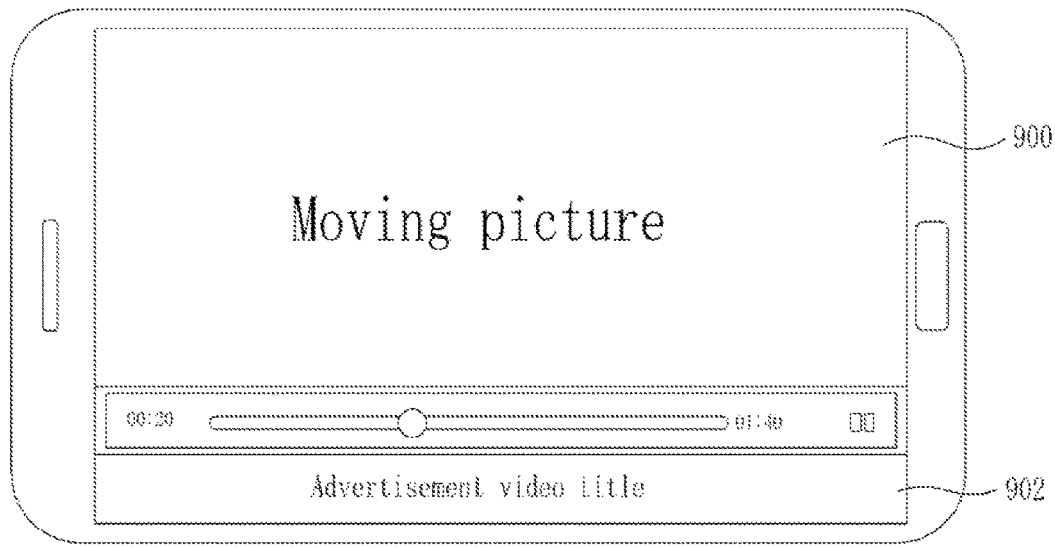
Figure 9:
Figure 9:

Referring to FIG. 9, in response to a touch on a recall banner 902 displayed on a moving picture screen 900, a moving picture being played may be paused and the moving picture screen 900 may disappear and the advertisement screen 500 may be automatically displayed. Here, the advertisement video having been played by the mobile terminal 100 before playing the moving picture may be recalled and then be played again by the mobile terminal 100. The skip UI 503 may be displayed on the advertisement screen 500 from a point in time at which the recalled advertisement video starts being played. In response to a touch on the skip UI 503 displayed on the advertisement screen 500 or in response to a termination in playing the recalled advertisement video without touching the skip UI 503, the mobile terminal 100 may automatically resume the moving picture that was playing previously, before display of the advertisement screen 500, by returning to a point in time at which the moving picture is paused.

Figure 10:
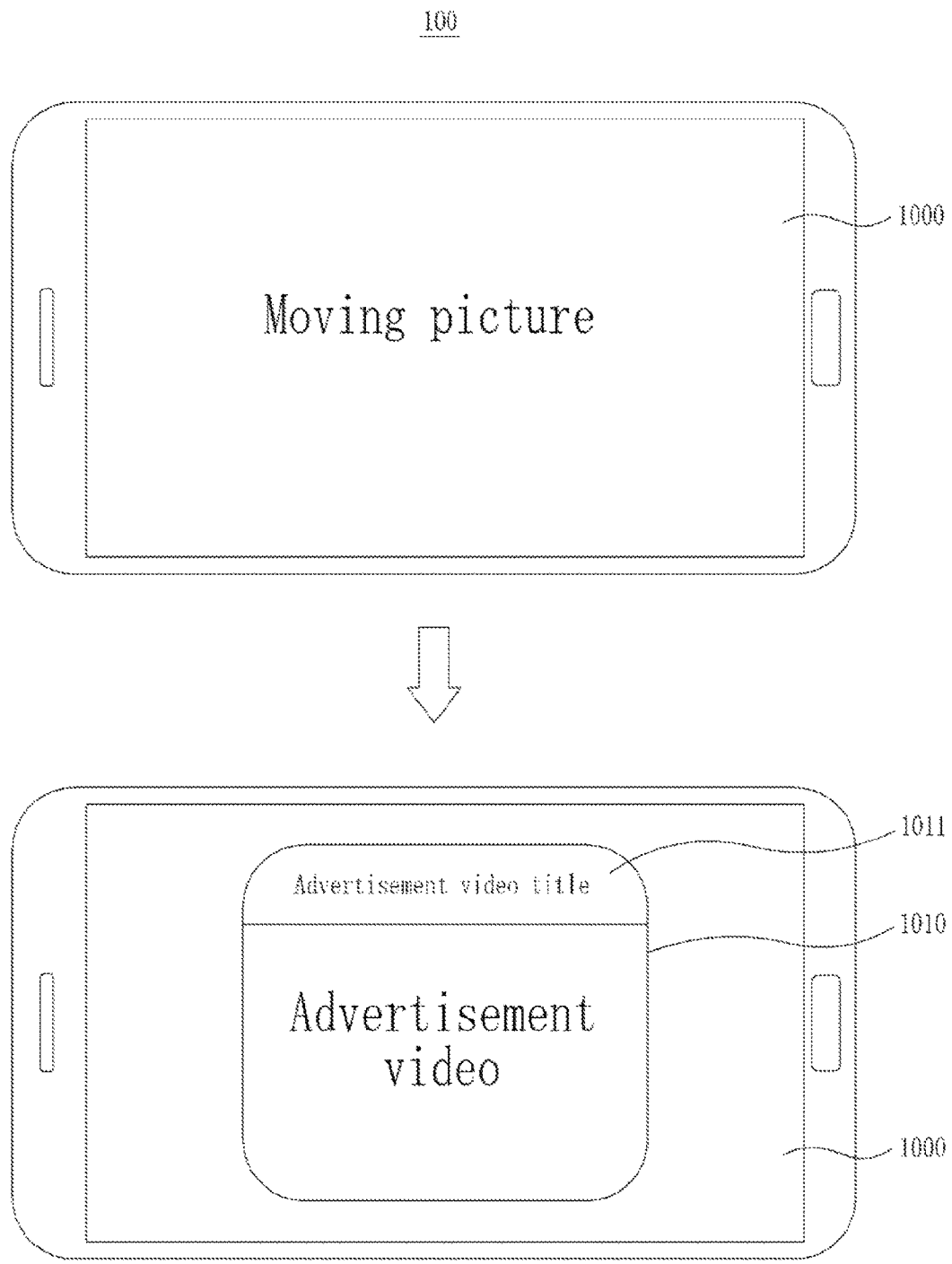
FIGS. 10 through 12 illustrate examples of a mid-roll advertisement displaying process according to one or more example embodiments.
Figure 11:
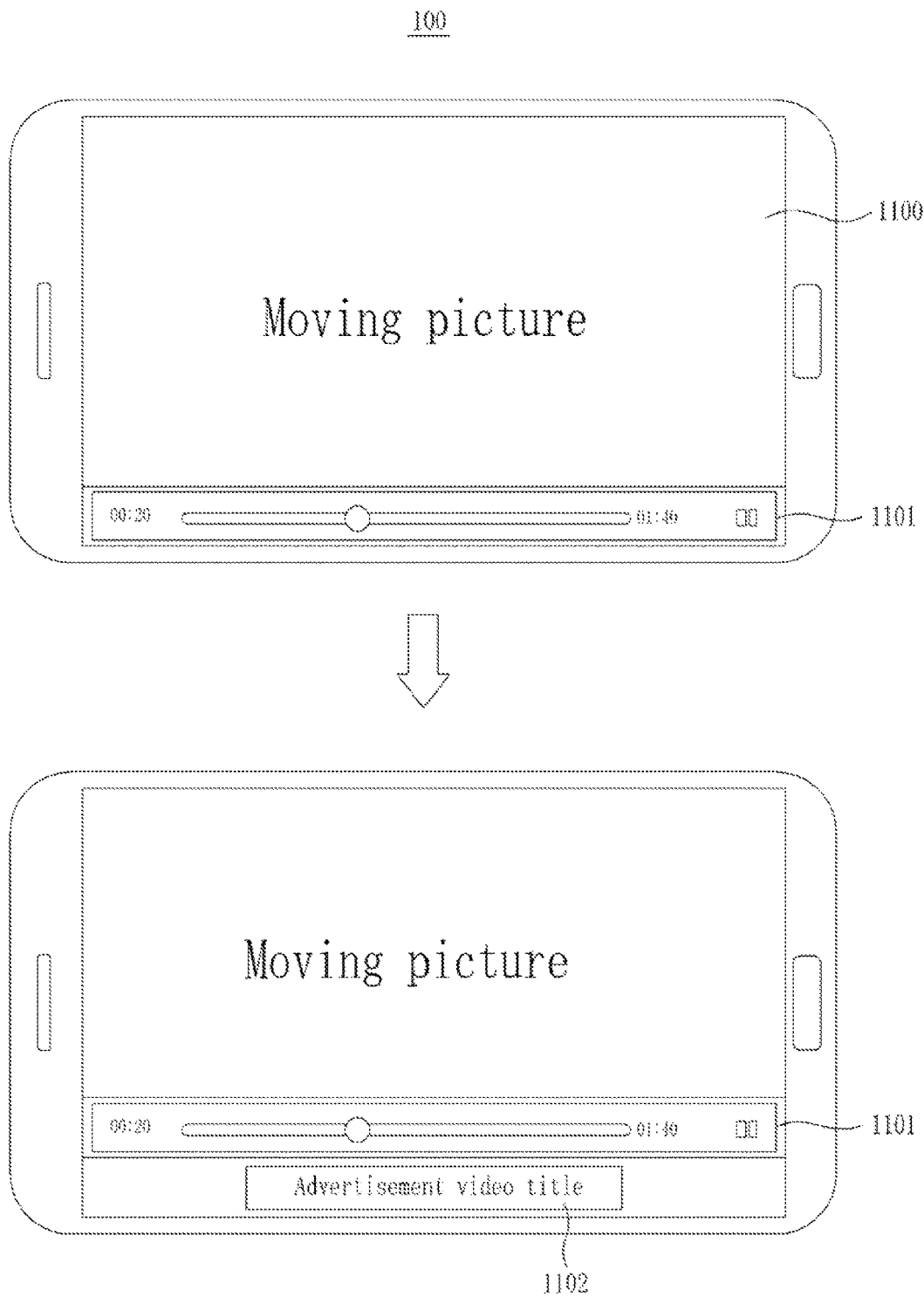
Figure 12:
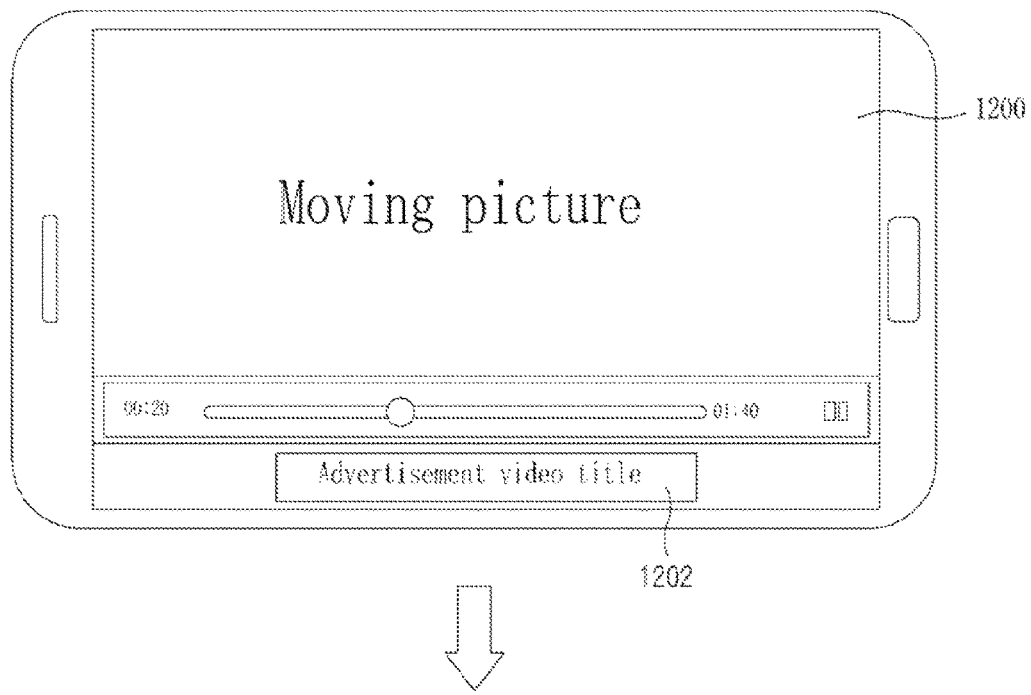
Figure 12:
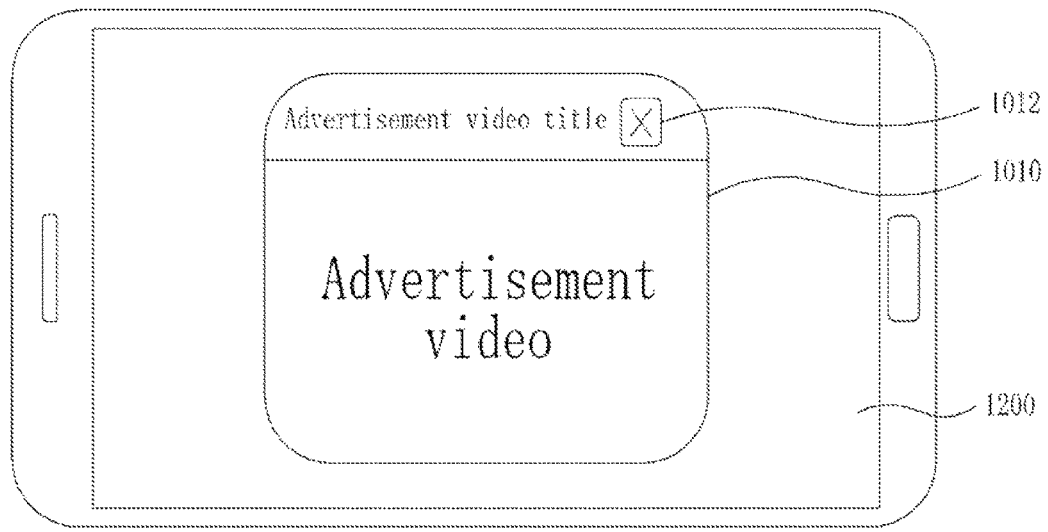

FIGS. 10 through 12 illustrate examples of a mid-roll advertisement displaying process according to one or more example embodiments. FIGS. 10 through 12 illustrate examples of a screen of a mobile terminal 100 of a user 140 on which a moving picture and an advertisement video are displayed.

Referring to FIG. 10, when buffering is ongoing during playing a moving picture, an advertisement screen 1010 may be popped up and displayed on a moving picture screen 1000. The advertisement screen 1010 may be displayed by the mobile terminal 100 in a layered form on the middle of the moving picture screen 1000. An advertisement video title 1011 may also be displayed by the mobile terminal 100 on one area, for example, at an upper end of the advertisement screen 1010. Here, the advertisement video title may be provided by the mobile terminal 100 in a form of an image or a text. Once the advertisement screen 1010 is popped up on the moving picture screen 1000, the advertisement video may be played by the mobile terminal 100 on the advertisement screen. Once buffering of the moving picture is completed, the advertisement video being played may be suspended by the mobile terminal 100 and the advertisement screen 1010 may disappear, and the moving picture being viewed may automatically resume.

Referring to FIG. 11, when playing a moving picture after terminating an advertisement video, a moving picture player UI 1101 for controlling a play of the moving picture may be displayed on one area, for example, at a lower end of a moving picture screen 1100, in response to a touch of a user 140 on the moving picture screen 1100. Here, the moving picture player UI 1101 may be provided as a UI bar including function buttons, for example, a pause and a play. Referring to FIG. 11, if a predetermined or, alternatively, desired period of time, for example, one second is elapsed after displaying the moving picture player UI 1101 on the moving picture screen 1100, the moving picture player UI 1101 may be rolled up and a recall banner 1102 capable of recalling an advertisement video having been played when buffering a moving picture may be displayed on the moving picture screen 1100. Here, the recall banner 1102 may be configured in a form the same as or similar to the advertisement video title 1011 of FIG. 10. Accordingly, a user 140 may more easily recognize that a corresponding UI functions to recall an advertisement video previously viewed by the user 140. Further, when no action is performed on the moving picture screen 1100 during a predetermined or, alternatively, desired period of time, the mobile terminal 100 may hide elements, for example, the moving picture player UI 1101 and the recall banner 1102, displayed on the moving picture screen 1100. Also, the mobile terminal 100 may also hide the elements displayed on the moving picture screen 1100 in response to a touch on an area of the screen of the mobile terminal 100 other than an area on which the elements displayed on the moving picture screen 1100.

Referring to FIG. 12, in response to a touch on a recall banner 1202 on a moving picture screen 1200, a moving picture being played may be paused and the advertisement screen 1010 may be automatically displayed by the mobile terminal 100 in a layered form on the paused moving picture screen 1200. Here, the advertisement video having been played before playing the moving picture may be recalled and then be played again by the mobile terminal 100 on the advertisement screen 1010. A close UI 1012 capable of terminating the advertisement video may be displayed by the mobile terminal 100 on the advertisement screen 1010 from a point in time at which the recalled advertisement video starts being played. In response to a touch on the close UI 1012 displayed on the advertisement screen 1010 or in response to a termination in playing the recalled advertisement video without touching the close UI 1012 displayed on the advertisement screen 1010, the by the mobile terminal 100 may cause the layered advertisement screen 1010 to disappear and the mobile terminal 100 may automatically resume the moving picture that was viewed by the user 140 by returning to a point in time at which the moving picture is paused.

Although example embodiments in which an advertisement video is displayed on a mobile terminal 100 of a user 140 are described, they are only examples to help the understanding of the present disclosure and thus, the present disclosure is not limited thereto. For example, a configuration layout of a moving picture screen or an advertisement screen, elements displayed on the moving picture screen or the advertisement screen, methods or orders of displaying the elements, and switching methods or orders therebetween may be readily modified.

Figure 13:
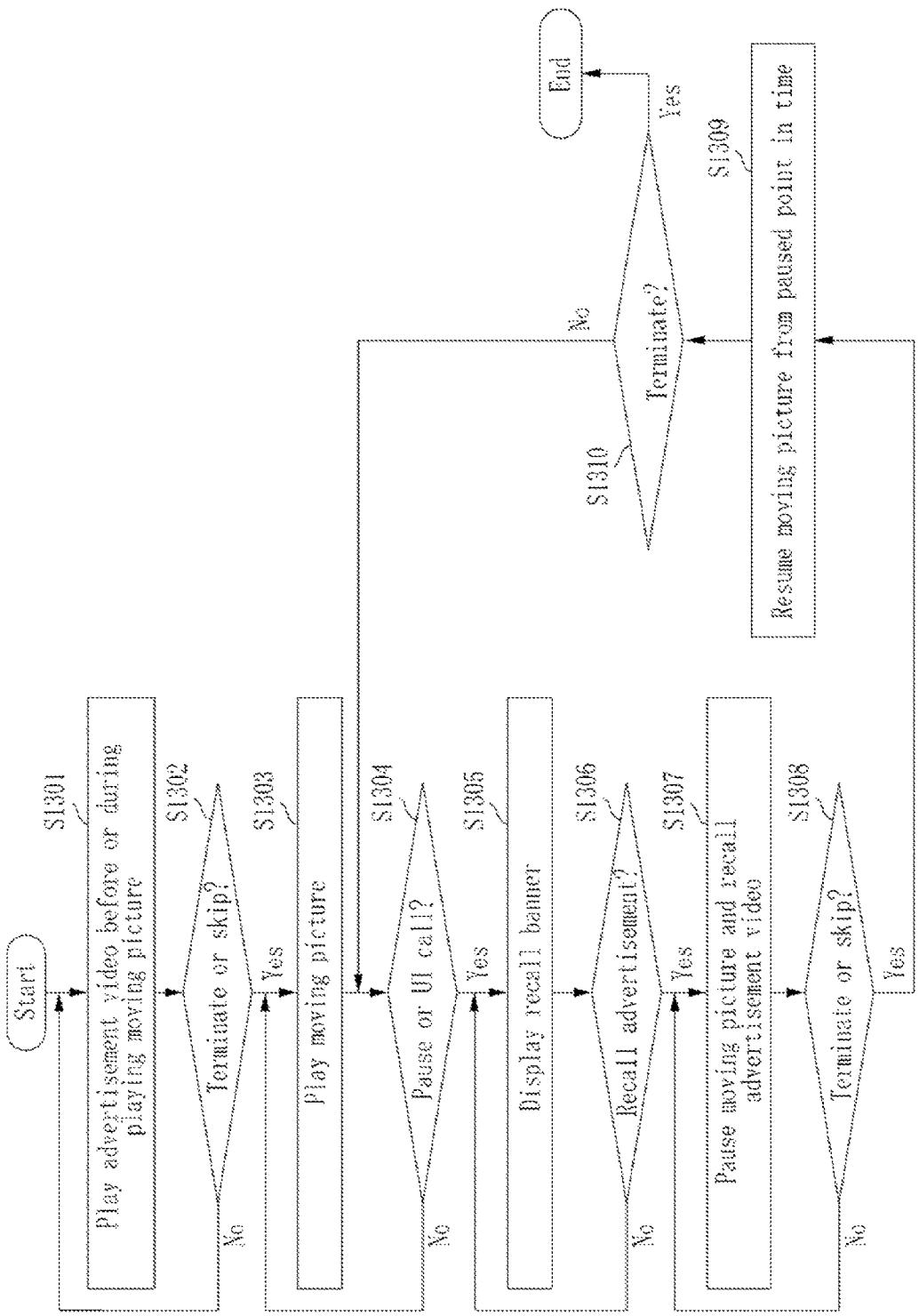
FIG. 13 is a flowchart illustrating a moving picture providing method of a user terminal according to one or more example embodiments.

FIG. 13 is a flowchart illustrating a moving picture providing method of a user terminal according to one or more example embodiments. The moving picture providing method according to the example embodiments may be performed by a moving picture providing system corresponding to the terminal of the user 140. The operations of the moving picture providing system described herein with respect to FIG. 13 may be performed, for example, by a terminal of the user 140 including, for example the mobile terminal 100.

In operation S1301, the moving picture providing system may be provided with moving picture content including an advertisement video through an access to a publisher 130, and may play the advertisement video before or during playing a moving picture based on a predetermined or, alternatively, desired advertisement play time. As an example, in the case of a pre-roll advertisement, the moving picture providing system may initially play an advertisement video before playing a moving picture. As another example, in the case of a mid-roll advertisement, the moving picture providing system may play an advertisement video during buffering the moving picture when buffering occurs during playing a moving picture. Here, an advertisement screen on which the advertisement video is played may be configured as a single screen, or may be configured as a pop-up screen to be displayed in a layered form on a moving picture screen.

In operations S1302 and S1303, the moving picture providing system may play the moving picture in response to a suspension or a termination in playing the advertisement video. As an example, in the case of a pre-roll advertisement, the moving picture providing system may start playing a moving picture in response to a termination in an advertisement video or a skip request from a user 140. As another example, in the case of a mid-roll advertisement, once buffering of a moving picture is completed, the moving picture providing system may resume the moving picture from a point in time at which the moving picture is paused due to buffering.

In operations S1304 and S1305, the moving picture providing system may provide a UI environment capable of recalling the advertisement video having been played in operation S1301, in response to a pause of the moving picture being played or an occurrence of a call for a UI, for example, a moving picture player UI, associated with the moving picture in response to a user 140 request. As an example, the moving picture providing system may display a recall UI capable of recalling an advertisement video in a banner form at a predetermined or, alternatively, desired location of a moving picture screen (see 802 of FIG. 8 and 1102 of FIG. 11). For example, a recall banner may be displayed at a lower end of a moving picture screen, or may be displayed on a moving picture player UI or at a location adjacent thereto when the moving picture player UI is displayed on the moving picture screen. The location of, and method of displaying, the recall banner discussed above are only examples and thus, a location or a method of displaying the recall banner may be readily modified. Once the advertisement video with respect to the moving picture is played once, it is possible to display a recall UI for the corresponding advertisement video without restrictions on a location or a form. As an example, by displaying the recall banner on the moving picture screen in a state in which the moving picture is paused or a UI is displayed, a user 140 may recognize a corresponding advertisement without being obstructed from viewing the moving picture.

In operations S1306 and S1307, the moving picture providing system may pause the moving picture being played and then may recall and play the advertisement video having been played in operation S1301, in response to an advertisement recall command from the user 140. Here, the recalled advertisement video may be played on the same advertisement screen as the advertisement screen on which the advertisement video has been played in operation S1301. The user 140 may recall and view again the advertisement video that the user 140 has viewed at least once during playing the moving picture.

In operations S1308 and S1309, in response to a suspension or a termination in playing the advertisement video being viewed by the user 140, the moving picture providing system may resume the moving picture from a point in time at which the moving picture is paused by returning to operation S1307.

In operation S1310, once the moving picture is terminated, the moving picture providing system may terminate all the process. During playing the moving picture, the moving picture providing system may support an environment in which the advertisement video is recallable through operations S1304 through S1309.

A terminal corresponding to the moving picture providing system of FIG. 13 may also perform the moving picture providing method of FIG. 13 according to a control of an application installed in the terminal. In this case, the application may include modules configured to control the terminal to perform the operations included in the moving picture providing method. A file distribution system for distributing a file for installing the application is described above using the file distribution system 150 of FIG. 1.

Figure 14:
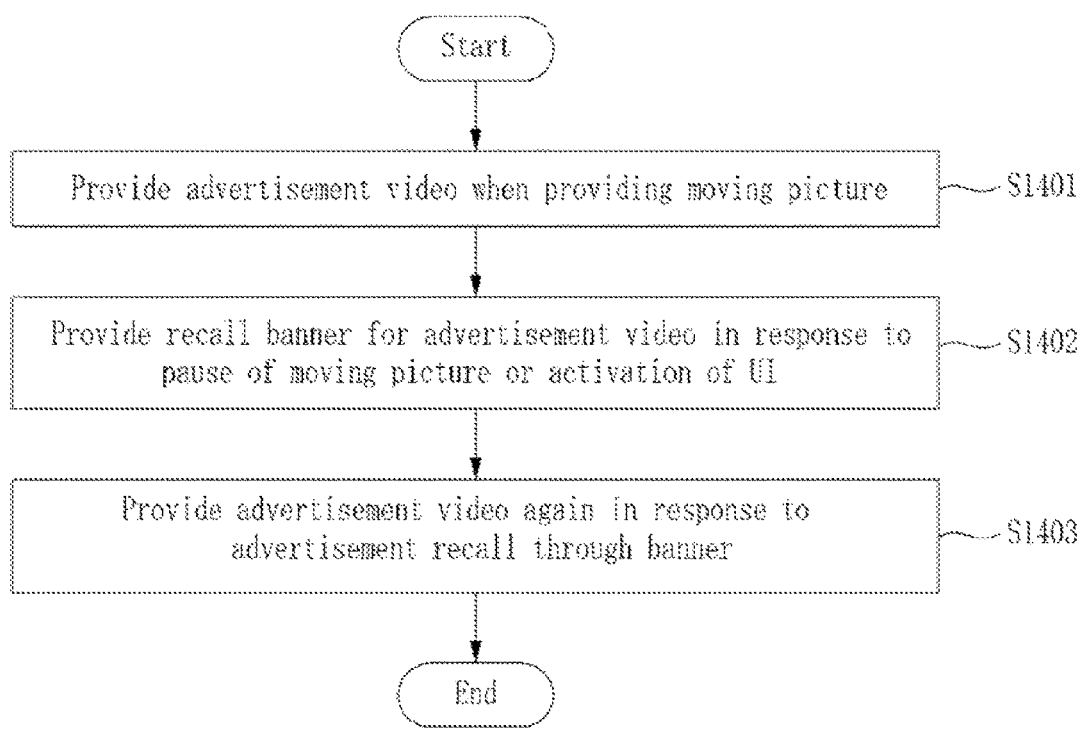
FIG. 14 is a flowchart illustrating a moving picture providing method of a publisher according to one or more example embodiments.

FIG. 14 is a flowchart illustrating a moving picture providing method of a publisher 130 according to one or more example embodiments. The moving picture providing method according to the example embodiments may be performed by a moving picture providing system corresponding to the publisher 130. Accordingly, the operations of the moving picture providing system described herein with respect to FIG. 14 may be performed, for example, by the publisher 130.

In operation S1401, when providing a moving picture to a user 140, the moving picture providing system may receive an advertisement video from an advertisement platform 120 and may provide the advertisement video and the moving picture to the user 140. Here, the advertisement platform 120 may randomly select and provide an advertisement video irrelevant to the moving picture, or may extract and provide an advertisement video relevant to the moving picture. As described above, the moving picture providing system may provide the advertisement video in a pre-roll form before playing the moving picture, or may provide the advertisement video in a mid-roll form in the case of an occurrence of buffering during playing the moving picture. In response to a termination in the advertisement video being played or a suspension by skip, a moving picture corresponding to main content may be played.

In operation S1402, in response to a pause in the moving picture being played at the terminal of the user 140 or an activation of a UI, for example, a moving picture player UI, associated with the moving picture during playing the moving picture, the moving picture providing system may receive a state of the moving picture from the terminal of the user 140 and may provide a recall banner for the advertisement video provided in operation S1401. Here, the recall banner may include a UI element capable of recalling the advertisement video and may be displayed on a moving picture screen at the terminal of the user 140.

In operation S1403, when the user 140 requests viewing again the advertisement video through the recall banner, the moving picture providing system may receive an advertisement recall request from the terminal of the user 140 and may provide the advertisement video to the user 140 again.

The moving picture providing method described above with reference to FIGS. 13 and 14 may refer to detailed description made above with reference to FIGS. 1 through 12, and may include a more reduced number of operations or additional operations based thereon. Also, at least two operations may be combined and orders or locations thereof may be changed.

As described above, according to one or more example embodiments, it is possible to reflect a current trend of expanding to a single content genre beyond a stereotyped product advertisement by providing a recallable advertisement while using a moving picture. Also, it is possible to satisfy a user 140 request for viewing again an advertisement video by enabling the user 140 to view again the advertisement video. Also, according to one or more example embodiments, it is possible to enable an advertiser 110 to achieve a relatively high advertising effect by displaying a banner of a recallable advertisement video at a point in time at which the moving picture is paused or a UI of a moving picture is activated. Also, according to one or more example embodiments, it is possible to decrease a moving picture view obstruction level of a user 140 by pausing a moving picture being viewed by the user 140 in response to a request of the user 140 and concurrently, recalling an advertisement video in an environment in which the user 140 is substantially or, alternatively, maximally not obstructed in the course of viewing the moving picture.

The units described herein may be implemented using hardware components, software components, or a combination thereof. For example, a processing device may be implemented using one or more special purpose computers which are programmed to operate in a specific way, including, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are designed specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A moving picture contents providing method, the moving picture contents including a first moving picture and a moving picture advertisement, the method comprising:
    playing, by a processor, the moving picture advertisement before or during playing the first moving picture;
    playing, by the processor, the first moving picture in response to a termination or a suspension in playing the moving picture advertisement;
    activating, by the processor, a recall user interface (UI) during playing the first moving picture, the recall UI being a UI for recalling the moving picture advertisement; and
    playing, by the processor, the moving picture advertisement again in response to a request for recalling the moving picture advertisement through the recall UI,
    wherein the playing the moving picture advertisement includes displaying a moving picture advertisement title configured in an image or text form having a first shape on a screen on which the moving picture advertisement is played, and
    wherein the activating a recall UI includes displaying the recall UI configured in a banner on a screen on which the first moving picture is played such that, the banner has substantially the same shape as the first shape, and the banner includes the moving picture advertisement title.

2. The method of claim 1, wherein the activating a recall UI comprises: displaying the recall UI on a screen on which the first moving picture is paused, when the first moving picture being played enters into a pause state.

3. The method of claim 1, wherein the activating of a recall UI comprises:
    displaying the recall UI on a screen on which the first moving picture is played, in response to an activation of a UI associated with the first moving picture on the screen on which the first moving picture is played.

4. The method of claim 3, wherein the recall UI is displayed on an area on which the UI associated with the first moving picture is displayed or an area adjacent thereto.

5. The method of claim 1, wherein the playing the moving picture advertisement again comprises:
    switching a screen on which the first moving picture is played to a screen on which the moving picture advertisement is played, or displaying the screen on which the moving picture advertisement is played on the screen on which the first moving picture is played in a layer form.

6. The method of claim 1, wherein the moving picture advertisement is an advertisement video provided before or during playing the first moving picture.

7. Non-transitory computer-readable storage media storing a program that, when executed by a processor, causes the processor to perform operations for providing moving picture contents including a first moving picture and a moving picture advertisement, the operations including:
    playing the moving picture advertisement before or during playing the first moving picture;
    playing the first moving picture in response to a termination or a suspension in playing the moving picture advertisement;
    activating a recall user interface (UI) during playing the first moving picture, the recall UI being a UI for recalling the moving picture advertisement during playing the first moving picture; and
    playing the moving picture advertisement again in response to a request for recalling the moving picture advertisement through the recall UI,
    wherein the playing the moving picture advertisement includes displaying a moving picture advertisement title configured in an image or text form having a first shape on a screen on which the moving picture advertisement is played, and
    wherein the activating a recall UI includes displaying the recall UI configured in a banner on a screen on which the first moving picture is played such that, the banner has substantially the same shape as the first shape, and the banner includes the moving picture advertisement title.

8. The non-transitory computer-readable storage media of claim 7, wherein the activating a recall UI comprises:
    displaying the recall UI on a screen on which the first moving picture is paused, when the first moving picture being played enters into a pause state.

9. A moving picture contents providing system, the moving picture contents including a first moving picture and a moving picture advertisement, the system comprising:
    a memory storing instructions; and
    one or more processors configured to execute the instructions such that the one or more processors are configured to perform operations including,
    playing the moving picture advertisement before or during playing the first moving picture, by displaying a moving picture advertisement title configured in an image or text form having a first shape on a screen on which the moving picture advertisement is played, playing the first moving picture in response to a termination or a suspension in playing the moving picture advertisement, activating a recall user interface (UI) during playing the first moving picture, the recall UI being a UI for recalling the moving picture advertisement during playing the first moving picture, during the process of activating the recall UI, displaying the recall UI configured in a banner form on a screen on which the first moving picture is played such that, the banner has substantially the same shape as the first shape, and the banner includes the moving picture advertisement title, and playing the moving picture advertisement again in response to a request for recalling the moving picture advertisement through the recall UI.

10. The system of claim 9, wherein the processor is configured such that the activating a recall UI comprises:

displaying the recall UI on a screen on which the first moving picture is paused, when the first moving picture being played enters into a pause state.

\* \* \* \* \*